United States Patent

Anderson et al.

Patent Number: 5,884,471
Date of Patent: Mar. 23, 1999

[54] DEVICE FOR OPERATING AN ANNULAR COMBUSTION CHAMBER EQUIPPED WITH COMBINED BURNERS FOR LIQUID AND GASEOUS FUELS

[75] Inventors: Gordon Anderson, Baden; Volkmar Galke; Roger Suter, both of Zürich, all of Switzerland

[73] Assignee: Asea Brown Boveri AG, Baden, Switzerland

[21] Appl. No.: 845,390

[22] Filed: Apr. 25, 1997

[30] Foreign Application Priority Data

May 10, 1996 [DE] Germany .................. 196 18 856.3

[51] Int. Cl.[6] .................. F02C 7/22; F23R 3/26
[52] U.S. Cl. .................. 60/39.23; 60/740
[58] Field of Search .................. 60/39.06, 39.07, 60/39.23, 39.29, 39.463, 39.48, 740

[56] References Cited

U.S. PATENT DOCUMENTS

| | | | |
|---|---|---|---|
| 1,338,679 | 5/1920 | Davison . | |
| 2,595,759 | 5/1952 | Buckland et al. | 60/740 |
| 3,668,869 | 6/1972 | DeCorso et al. | 60/740 |
| 3,763,650 | 10/1973 | Hussey et al. | 60/39.463 |
| 5,097,666 | 3/1992 | Shekleton et al. | 60/740 |

FOREIGN PATENT DOCUMENTS

| | | |
|---|---|---|
| 0321809B1 | 6/1989 | European Pat. Off. . |
| 3820962A1 | 1/1989 | Germany . |
| 4417199A1 | 11/1994 | Germany . |
| 4424599A1 | 1/1996 | Germany . |
| 2091409A | 7/1982 | United Kingdom . |

*Primary Examiner*—Louis J. Casaregola
*Attorney, Agent, or Firm*—Burns, Doane, Swecker & Mathis, L.L.P.

[57] ABSTRACT

The invention relates to a device for operating an annular combustion chamber (15) which is equipped with combined burners (1) for liquid (4) and gaseous fuels (9), in particular burners of the double-cone design, each burner (1) having a fuel lance (3), with at least one additional air passage (7), for feeding the liquid fuel (4) and an airblast nozzle (2) for atomizing the liquid fuel (4), into which airblast nozzle (2) atomizing air (5) is fed from outside the burner hood (13), and an adjusting mechanism being provided for at least partly throttling the inflow of the atomizing air (5) during gas operation, wherein the adjusting mechanism is an external valve (21) which is arranged in a main feed line (19), coming from the compressor outlet (18), for the atomizing air (5), the main feed line (19) leading into a ring line (20), and the ring line (20) being connected to the head (24) of each fuel lance (3) via one branch line (23) each.

2 Claims, 3 Drawing Sheets

DEVICE FOR OPERATING AN ANNULAR COMBUSTION CHAMBER EQUIPPED WITH COMBINED BURNERS FOR LIQUID AND GASEOUS FUELS

BACKGROUND OF THE INVENTION

1. Field of the Invention

The invention relates to the field of combustion technology. It relates to a device for operating an annular combustion chamber for gas turbines which is equipped with combined burners for liquid and gaseous fuels, in particular burners of the double-cone design, each burner having an airblast nozzle for atomizing the liquid fuel, into which airblast nozzle atomizing air is fed from outside the burner hood, and the inflow of the atomizing air being at least partly throttled during gas operation.

2. Discussion of Background

To achieve the lowest possible NOx emissions, burners are operated close to their lean extinction limit. As a result, however, the control range of the burners is greatly restricted. In order to remove this disadvantage, internal piloting is used, for example, during part-load operation of a gas turbine, during which piloting the fuel gases are enriched with additional fuel near the axis. The stability range of the burners is thereby extended so far that reliable operation is guaranteed even under part-load conditions.

To operate a burner alternatively with gaseous or liquid fuel, it is known to atomize the liquid fuel by means of an airblast nozzle. To this end, air is injected near the axis, i.e. in the center of the burner. In the same way as the combustion air in premix burners of the double-cone design, the basic construction of which is described in U.S. Pat. No. 4,932,861 to Keller et al., this atomizing air is extracted from a plenum outside the burner.

However, the injection of the atomizing air takes place not only during the fuel-oil atomization but also in gas operation, during which, however, no air at all is required for the atomization. In gas operation of the burner, this additional air destabilizes the flame, on the one hand due to the mixture being made leaner and on the other hand due to the incident flow itself. This leads in turn to a distinct reduction in the lean extinction limit of the gas flame.

DE 44 24 599 A1 discloses a method and a plurality of devices for operating a combined burner for liquid and gaseous fuels, in which this disadvantage is removed by provision being made to control the inflow of the atomizing air, the inflow of the atomizing air being at least partly throttled during operation with gaseous fuel.

To this end, according to DE 44 24 599 A1 the airblast nozzle, for example, is designed in such a way that the pilot-gas passage leads upstream of the atomizing cross section into at least one atomizing-air passage so that the throttling of the atomizing air is effected by means of the pilot gas. This embodiment has the disadvantage that, during operation of the burner with gaseous fuel, work has to be carried out with additional pilot gas not only during the starting phase but constantly.

In another embodiment described in DE 44 24 599 A1, in which the burner is fastened in the burner hood by a burner support having an integrated air-inlet opening for the blast air, and a fuel lance adjoins the burner support upstream for the feed of the liquid fuel, an adjusting mechanism, e.g. in the form of a displaceable or rotatable sleeve, is arranged on the fuel lance or the burner support, which adjusting mechanism at least partly closes the air-inlet opening for the atomizing air during operation of the burner with gaseous fuel. This solution has the disadvantage that the adjusting mechanism is arranged in the interior of the machine and is therefore difficult of access.

GB 2 091 409 A discloses an airblast nozzle in which the inflow of the combustion and atomizing air is jointly controlled in accordance with the demand of the combustion chamber. To this end, two different metering valves are arranged which are acted upon by a common piston. This solution has the disadvantage that no separate control of the atomizing air is possible. In addition, the valves are arranged directly on the nozzle and are therefore exposed to high temperatures.

SUMMARY OF THE INVENTION

Accordingly, one object of the invention, in attempting to avoid all these disadvantages, is to provide a simple device for operating an annular combustion chamber equipped with combined burners for liquid and gaseous fuels for the purpose of hot-gas generation, which device enables separate control of the atomizing air so that the lean extinction limit of the gas flame is increased without impairing the atomization of the liquid fuel. The device is to work reliably and is to enable problem-free change-over between gas and oil operation of the burners.

According to the invention, in a device for operating an annular combustion chamber which is equipped with combined burners for liquid and gaseous fuels, in particular burners of the double-cone design, each burner having a fuel lance, with additional air passages, for feeding the liquid fuel and an airblast nozzle for atomizing the liquid fuel, into which airblast nozzle atomizing air is fed from outside the burner hood, and an adjusting mechanism being provided for at least partly throttling the inflow of the atomizing air during gas operation, this is achieved in that the adjusting mechanism is an external valve which is arranged in a main feed line, coming from the compressor outlet, for the atomizing air, the main feed line leading into a ring line, and the ring line being connected to the head of each fuel lance via one branch line each.

The advantages of the invention consist in the fact that the inflow of the atomizing air can be controlled in a simple manner outside the nozzle or the burner and can therefore be optimally adapted to the respective operating conditions. Optional change-over between gas and oil operation of the burner is possible, the valve being opened so wide during oil operation that the requisite atomizing air passes unhindered into the airblast nozzle, whereas during gas operation of the burner the valve is either completely closed and thus the inflow of the atomizing air is prevented or the valve is partly closed so that only a certain portion of air scarcely affecting the flame stability passes into the fuel lance. The external arrangement of the control system also ensures its reliable operation at high operating temperatures in the interior of the machine.

It is especially expedient if the ring line is arranged on the outside of the casing of the gas turbine. This permits simple assembly and problem-free accessibility.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings of an annular combustion chamber which is equipped with combined burners for liquid and gaseous fuels and prepares the hot gas required for admission to a gas turbine, wherein.

DESCRIPTION OF THE PREFERRED EMBODIMENTS

Figure 1:
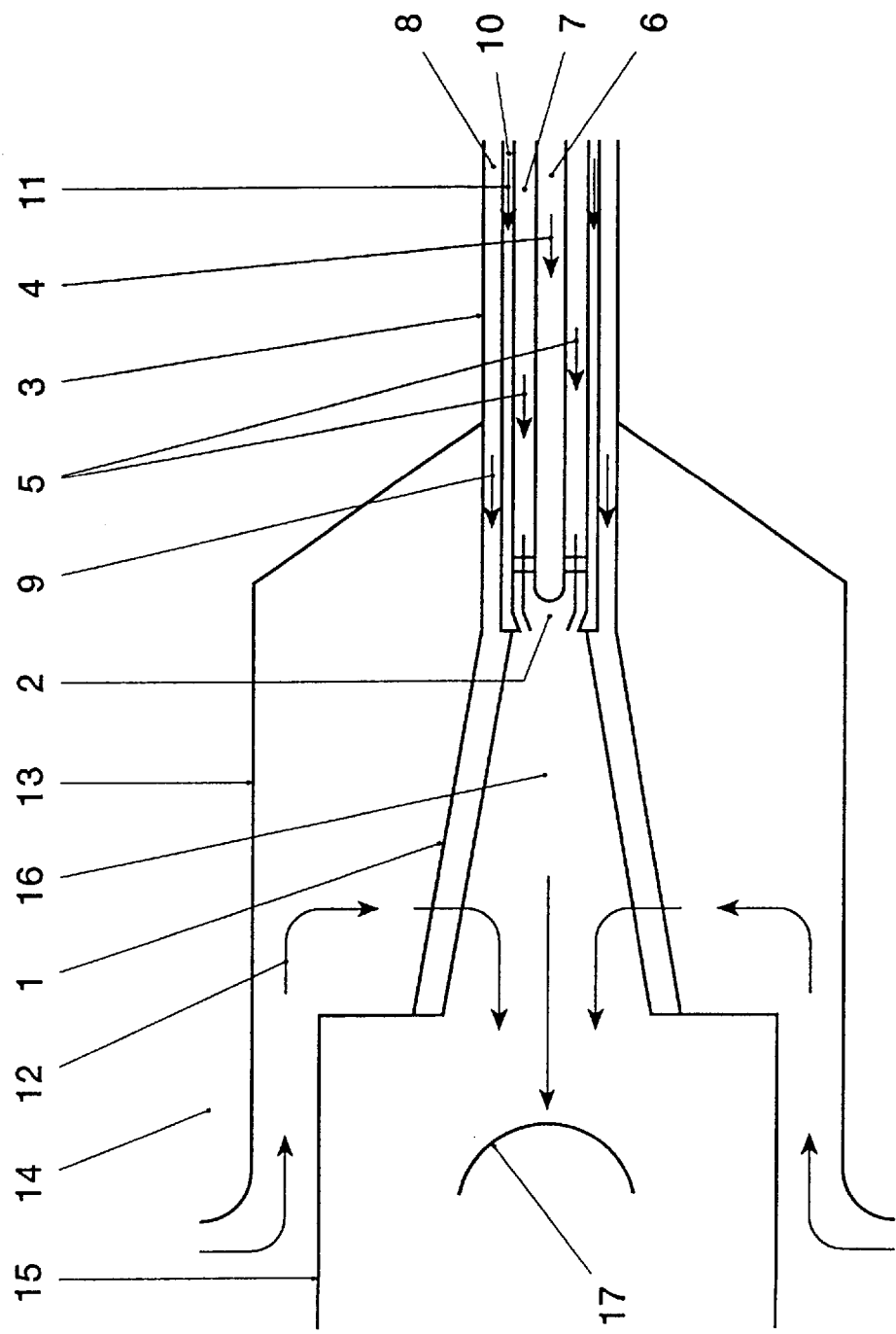
FIG. 1 shows a schematic representation of the arrangement of a burner equipped with an airblast nozzle.

Referring now to the drawings, wherein like reference numerals designate identical or corresponding parts throughout the several views, only the elements essential for understanding the invention are shown, and the direction of flow of the working media is designated by arrows, FIG. 1 schematically shows a burner 1 of the double-cone design. Its basic construction is described in detail in U.S. Pat. No. 4,932,861 to Keller et al., so that the details are therefore dispensed with here. An airblast nozzle 2 is arranged at the upstream end of the burner 1. The airblast nozzle 2 is supplied with liquid fuel 4 and atomizing air 5 via a fuel lance 3 connected to the double-cone burner 1. For this reason, a liquid-fuel passage 6 and an atomizing-air passage 7 are arranged in the fuel lance 3. In addition, the fuel lance 3 delivers the gaseous fuel 9 for the burner 1 via a gas passage 8. Finally, gaseous fuel, so-called pilot gas 11, for enriching the fuel gases near the axis of the double-cone burner may additionally be injected via a pilot-gas passage 10 arranged in the fuel lance 3. The combustion air 12 is fed to the burner 1 from the space inside the burner hood 13, which is connected to an air plenum 14. The burner 1 leads downstream into the combustion chamber 15.

During operation with liquid fuel 4, this liquid fuel 4 is directed into the airblast nozzle 2 via the liquid-fuel passage 6 arranged centrally in the fuel lance 3 and is finely atomized there by means of the atomizing air 5 fed via the atomizing-air passage 7. The fuel 4 thus atomized then passes into the burner interior space 16 for the purpose of premixing with the combustion air 12 flowing in via the tangential air-inlet slots of the double-cone burner 1. The mixture finally burns in the combustion chamber 15.

During operation with gaseous fuel 9, the inflow of the atomizing air 5, as described further below, is throttled or completely prevented. The gaseous fuel 9 is therefore premixed in an undisturbed manner with the combustion air 12 flowing into the burner interior space 16 via the tangential air-inlet slots. Forming downstream of the burner orifice is a backflow zone 17, at the tip of which the ignition of the fuel/air mixture is effected. A stable flame front then forms at this point. In order to guarantee stable burning of the flame even at the start or under part-load conditions, pilot gas 11 is fed to the nozzle 2 through the pilot-gas passage 10. The fuel gases are enriched and the stability range of the burner 1 is extended by this additional fuel 11.

Figure 2:
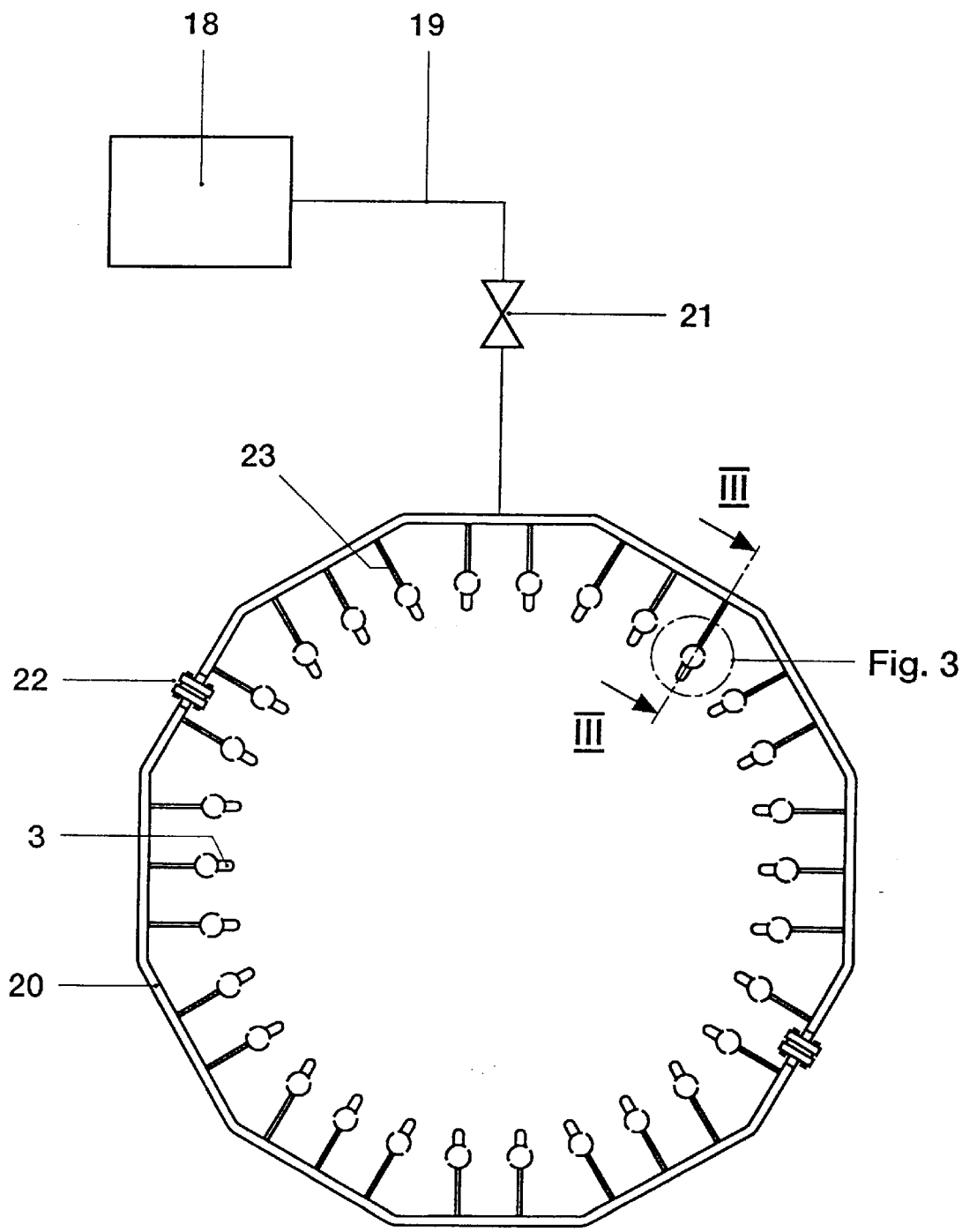
FIG. 2 shows a diagrammatic sketch of the device according to the invention.
Figure 3:
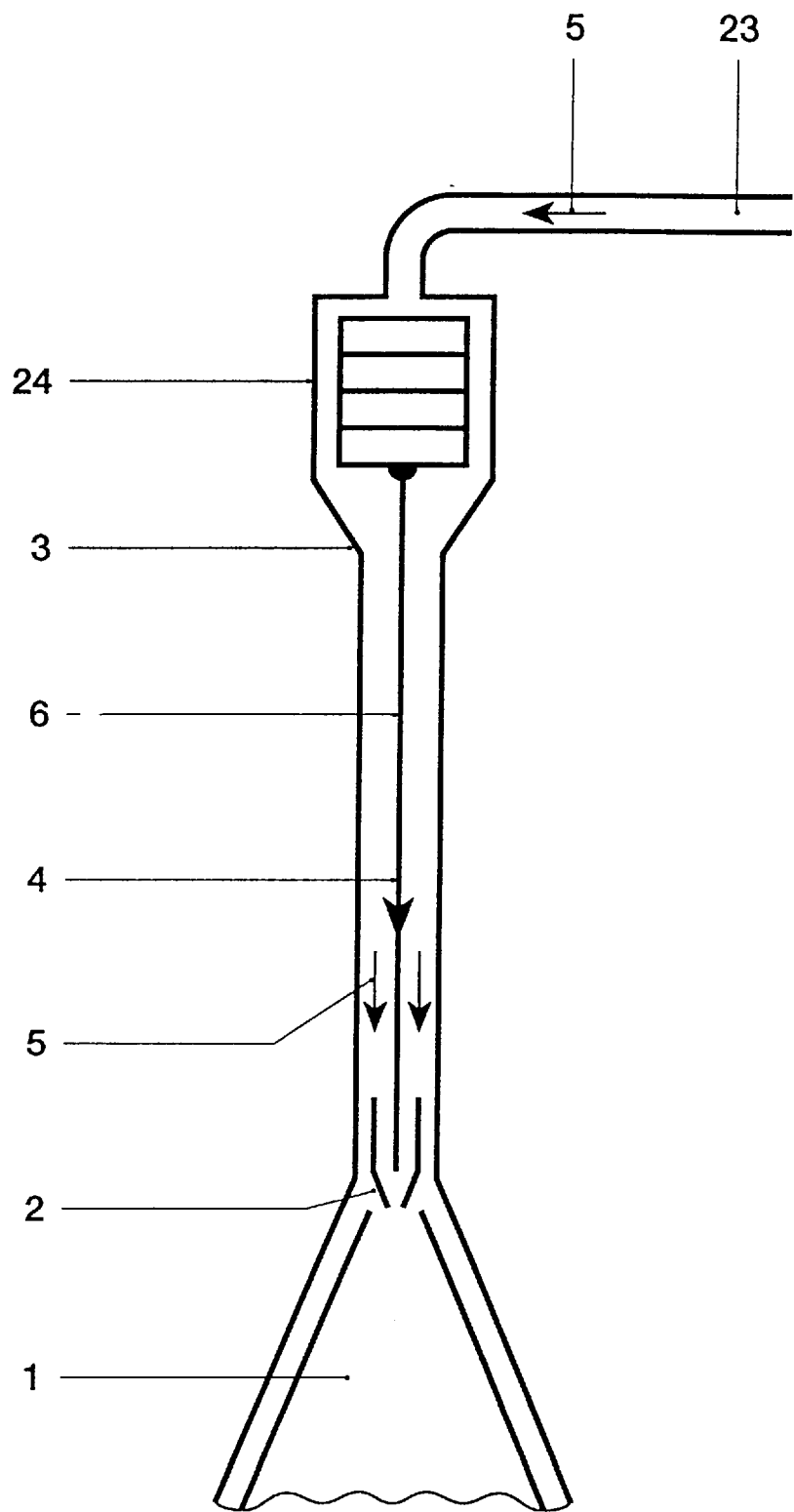
FIG. 3 shows an enlarged detail of FIG. 2.

FIG. 2 shows a diagrammatic sketch of the device according to the invention. The annular combustion chamber 15 is arranged between a compressor (not shown here) and a turbine (likewise not shown). A line 19 is connected to the compressor outlet 18 (shown schematically in FIG. 2) of the gas-turbine plant, which line 19 leads to a ring line 20 and is connected to the latter. The line 19 constitutes the main feed line for the atomizing air 5. Arranged in the line 19 is a valve 21 with which the quantity of the atomizing air 5 flowing into the ring line 20 can be regulated. The ring line 20 is mounted on the outside of the casing of the gas turbine and leads around the entire machine. For assembly reasons, the ring line 20 is split; its two halves are connected to one another by means of flanges 22. In the exemplary embodiment shown in FIG. 2, twenty branch lines 23 branch off from the ring line 20. In each case one of these branch lines 23 is connected at its other end to the head 24 of a fuel lance 3. This can be recognized especially clearly in the enlarged detail according to FIG. 3.

If the burners 1 of the annular combustion chamber 15 are operated with liquid fuel 4, the valve 21 is opened. The atomizing air 5 required for atomizing the liquid fuel 4 in the airblast nozzle can therefore pass unimpeded into the ring line 20 and from there via the branch lines 23 into the lance heads 24. The air 5 then flows through the atomizing-air passage 7 in the fuel lance 3 into the airblast nozzle 2, where it is used for atomizing the liquid fuel 4. After that, the atomized liquid fuel 4 is premixed with the main combustion air 12 and the mixture is finally burned in the combustion chamber 15, in the course of which only slight NOx emissions occur.

If a change-over is now made to gas operation, the valve 21 is at least partly closed so that only a certain portion of air 5 passes through the lines 19, 20 and 23 into the fuel lance 3. It is of course also possible to completely prevent the inflow of the atomizing air 5 by complete closing of the valve 21. In this way, it is possible to control the air quantity to be fed in a very simple manner and to obtain quick adaptation to the respective operating conditions. The gas flame is not destabilized. Change-over between gas and oil operation is possible without problem. During the change-over operation, no exchange of the fuel lances is necessary. In addition, the control of the air feed via an external valve has the advantage of good accessibility and good operational reliability, since the adjusting mechanism can be actuated outside the machine. This is especially important, since, in the course of the continual efficiency improvements, gas turbines are nowadays operated at higher and higher temperatures.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A device for operating an annular combustion chamber for gas turbines which is equipped with combined burners for liquid and gaseous fuels, each burner having a fuel lance, with at least one additional air passage, for feeding the liquid fuel and an airblast nozzle for atomizing the liquid fuel, into which airblast nozzle atomizing air is fed from outside the burner hood, and an adjusting mechanism being provided for at least partly throttling the inflow of the atomizing air during gas operation, wherein the adjusting mechanism is an external valve which is arranged in a main feed line coming from the compressor outlet for the atomizing air, the main feed line leading into a ring line, and the ring line being connected to a head of each fuel lance via one branch line each.

2. The device as claimed in claim 1, wherein the ring line (20) is arranged on the outside of the casting of the gas turbine.

* * * * *